(12) United States Patent
Ake et al.

(10) Patent No.: US 7,532,204 B2
(45) Date of Patent: May 12, 2009

(54) COORDINATE INPUT SYSTEM AND COORDINATE INPUT METHOD

(75) Inventors: Yasunori Ake, Nara (JP); Tomohiko Yamamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 674 days.

(21) Appl. No.: 11/214,778

(22) Filed: Aug. 31, 2005

(65) Prior Publication Data

US 2006/0044287 A1    Mar. 2, 2006

(30) Foreign Application Priority Data

Sep. 1, 2004    (JP) .............................. 2004-254471

(51) Int. Cl.
*G06F 3/041* (2006.01)
(52) U.S. Cl. .................................... 345/173; 178/18.01
(58) Field of Classification Search ......... 345/173–179, 345/18.01–18.11, 19.01–19.06; 178/18.01–18.11, 178/19.01–19.06
See application file for complete search history.

(56) References Cited

U.S. PATENT DOCUMENTS 6,661,406 B1 * 12/2003 Enoki .......................... 345/173

2004/0042645 A1 * 3/2004 Wang ........................... 382/125

FOREIGN PATENT DOCUMENTS

| JP | 04078973 A | * | 3/1992 |
| JP | 07-064696 | | 3/1995 |
| JP | 9-185454 A | | 7/1997 |
| JP | 2004-029918 | | 1/2004 |

* cited by examiner

*Primary Examiner*—Richard Hjerpe
*Assistant Examiner*—Stephen G Sherman
(74) *Attorney, Agent, or Firm*—Harness, Dickey & Pierce, P.L.C.

(57) ABSTRACT

A coordinate input system includes: a digitizer for indicating coordinate positions; a controller for extracting a plurality of coordinate data units from the indicated coordinate positions; a temporary storage memory for sequentially storing the extracted coordinate data units; a cosine value deriving section for defining vectors each connecting two of points associated with the respective coordinate data units and for deriving a cosine value of an angle formed by adjacent two of the vectors sandwiching a point selected from the points; and a control circuit for discarding one of the coordinate data units associated with the selected point when the cosine value is smaller than a given value and for transmitting and inputting one of the coordinate data units associated with the selected point when the cosine value is equal to or larger than the given value.

12 Claims, 9 Drawing Sheets

FIG. 13

| POINT NUMBER | COORDINATE DATA | X COORDINATE | Y COORDINATE | VECTOR NUMBER | VECTOR VX | VECTOR VY | ANGLE θ FORMED BY ADJACENT VECTORS | cos θ |
|---|---|---|---|---|---|---|---|---|
| 1 | P$_{n-4}$ | 366 | 297 | | | | | |
| 2 | P$_{n-3}$ | 409 | 262 | 11 | 43 | -35 | | |
| 3 | P$_{n-2}$ | 453 | 228 | 12 | 44 | -34 | | |
| 4 | P$_{n-1}$ | 496 | 199 | 13 | 43 | -29 | ANGLE θ$_{n-1}$ FORMED BY VECTORS 12 AND 13 | 0.998 |
| 5 | P$_n$ | 508 | 267 | 14 | 12 | 68 | ANGLE θ$_n$ FORMED BY VECTORS 13 AND 14 | -0.407 |
| 6 | P$_{n+1}$ | 574 | 158 | 15 | 66 | -109 | ANGLE θ$_{n+1}$ FORMED BY VECTORS 14 AND 15 | -0.752 |
| 7 | P$_{n+2}$ | 604 | 144 | 16 | 30 | -14 | ANGLE θ$_{n+2}$ FORMED BY VECTORS 15 AND 16 | 0.831 |
| 8 | P$_{n+3}$ | 625 | 136 | 17 | 21 | -8 | ANGLE θ$_{n+3}$ FORMED BY VECTORS 16 AND 17 | 0.997 |

COORDINATE INPUT SYSTEM AND COORDINATE INPUT METHOD

CROSS-REFERENCE TO RELATED APPLICATION

This Nonprovisional application claims priority under 35 U.S.C. §119(a) on Patent Application No. 2004-254471 filed in Japan on Sep. 1, 2004, the entire contents of which are hereby incorporated by reference.

BACKGROUND OF THE INVENTION

The present invention relates to systems and methods for inputting coordinate data to a host based on indicated coordinate positions.

Coordinate input systems for allowing operators to input given coordinates to hosts such as personal computers are known to date. In general, a coordinate input system samples coordinate positions continuously indicated with, for example, a coordinate input stylus at every given time and inputs sampled coordinate positions to a host as coordinate data. On the other hand, the host linearly interpolates the coordinate data so as to identify the path formed by coordinate positions indicated by an operator.

As the number of coordinate data units sampled as described above increases, the load necessary for arithmetic processing becomes heavier. In view of this, a conventional technique of omitting unnecessary coordinate data associated with an intermediate position so as to reduce the number of coordinate data units when the path formed by indicated coordinate positions is straight, for example, is known (see, for example, Japanese Unexamined Patent Publication No. 9-185454).

Specifically, a coordinate input system disclosed in Japanese Unexamined Patent Publication No. 9-185454 includes arithmetic means including: a coordinate data extracting section; a storage section, an angle deriving section; and an input section.

The coordinate data extracting section is configured to extract coordinate data at every given time from coordinate positions continuously indicated by an operator. The storage section stores the extracted coordinate data. The angle deriving section is configured to derive an angle which is the difference in direction between lines connecting points represented by the coordinate data to each other based on the stored coordinate data.

When the derived angle is smaller than a given value (e.g., when a coordinate input stylus, for example, indicating coordinate positions moves in a straight line), coordinate data associated with an intermediate position is discarded without being input to a host. On the other hand, when the derived angle is equal to or larger than the given value (e.g., the coordinate input stylus, for example, changes its direction and moves in a significantly different direction), coordinate data associated is input to the host. In this manner, the number of coordinate data units input to the host is reduced.

When an arithmetic circuit forming the arithmetic means is contaminated by a noise, there arises a problem in which coordinate data not agreeing with coordinate positions actually indicated by an operator is input to the host. However, in the coordinate input system disclosed in the above publication, redundant coordinate data is merely omitted when coordinate positions moves in a straight line. Therefore, the foregoing problem is not solved.

Regarding the foregoing problem, a coordinate input system including: an arithmetic circuit as described above; a display section including a back-light inverter; and an ultrasonic coordinate input stylus will be described as an example.

In the coordinate input system, an ultrasonic receiver for receiving an ultrasonic signal transmitted from the ultrasonic coordinate input stylus is provided. The ultrasonic receiver and the arithmetic circuit are connected to each other through a signal line.

This signal line might be contaminated by an ultrasonic noise generated from the back-light inverter. In this case, the ultrasonic noise causes abnormal coordinate data and this abnormal coordinate data is input to the host together with other normal coordinate data. As a result, the path formed by coordinate positions recognized by the host greatly deviates from the actual path indicated with the ultrasonic coordinate input stylus. That is, the noise contamination causes a problem in which desired coordinate data is not accurately input to the host.

SUMMARY OF THE INVENTION

It is therefore an object of the present invention to match coordinate data input to a host with indicated coordinate positions with high accuracy even if abnormal coordinate data is extracted from the indicated coordinate positions.

In order to achieve the object, according to the present invention, a plurality of coordinate data units are extracted from indicated coordinate positions, vectors connecting points associated with the respective coordinate data units are defined, and cosine values of angles each formed by adjacent two of the vectors sandwiching a point selected from the points are derived. Then, based on these cosine values, coordinate data to be actually input to a host is selected.

Specifically, a coordinate input system according to the present invention includes: indicating means for indicating coordinate positions; a coordinate data sequentially extracting section for extracting a plurality of coordinate data units from the coordinate positions indicated with the indicating means; a storage section for storing the coordinate data units in the order of the extraction; a cosine value deriving section for defining vectors connecting points associated with the respective coordinate data units in the order of the storage, and for deriving a cosine value of an angle formed by adjacent two of the vectors sandwiching a point selected from the points; and a coordinate data selecting section for discarding one of the coordinate data units associated with the selected point when the cosine value derived by the cosine value deriving section is smaller than a given value and for transmitting and inputting one of the coordinate data units associated with the selected point to a host when the cosine value is equal to or larger than the given value.

The coordinate data extracting section preferably extracts coordinate data units from the indicated coordinate positions at every given time.

The indicating means may be a coordinate input stylus.

The coordinate data selecting section preferably transmits and inputs, to the host, a coordinate data unit obtained when the coordinate input stylus is lifted.

The indicating means may be configured to transmit the coordinate positions as an ultrasonic signal, and the coordinate input system may further include an ultrasonic receiver for receiving the ultrasonic signal.

The coordinate input system may further include a display section for allowing the indicating means to indicate coordinate positions, and the display section may include a back-light inverter.

A method for inputting coordinates according to the present invention includes the steps of: (a) extracting a plurality of coordinate data units from indicated coordinate positions; (b) sequentially storing the coordinate data units extracted at the step (a); (c) defining vectors each connecting two of a plurality of points and deriving a cosine value of an angle formed by adjacent two of the vectors sandwiching a point selected from the points, the points being associated with the respective coordinate data units stored at the step (b); and (d) discarding one of the coordinate data units associated with the selected point when the cosine value derived at the step (c) is smaller than a given value, and transmitting and inputting one of the coordinate data units associated with the selected point to a host when the cosine value is equal to or larger than the given value.

-Advantages-

Now, advantages of the present invention will be described.

At step (a), a coordinate data extracting section extracts a plurality of coordinate data units from coordinate positions indicated with indicating means such as a coordinate input stylus. The coordinate data units are extracted at every given time, for example.

At step (b), a storage section sequentially stores the coordinate data units extracted by the coordinate data extracting section.

At step (c), first, a cosine value deriving section defines vectors connecting points associated with the respective coordinate data units stored in the storage section. Then, the cosine value deriving section derives a cosine value of an angle formed by adjacent two of the vectors sandwiching a point selected from the points.

At step (d), a coordinate data selecting section discards a coordinate data unit associated with the selected point when the cosine value derived by the cosine value deriving section is smaller than a given value. That is, this discarded coordinate data unit is considered abnormal coordinate data and is not transmitted to a host. On the other hand, the coordinate data selecting section transmits and inputs, to the host, a coordinate data unit associated with the selected point as normal coordinate data when the cosine value derived by the cosine value deriving section is equal to or larger than the given value. The coordinate data selecting section transmits, to the host, a coordinate data unit obtained when the coordinate input stylus is lifted.

Accordingly, the indicating means such as a coordinate input stylus transmits coordinate positions as an ultrasonic signal, for example. On the other hand, in receiving the ultrasonic signal, for example, even if an ultrasonic receiver receives abnormal coordinate data, this abnormal coordinate data is discarded by the coordinate selecting section, so that only normal coordinate data is transmitted and input to the host. As a result, the host is allowed to identify a path closely matching actually-indicated coordinate positions.

BRIEF DESCRIPTION OF THE DRAWINGS

FIG. 13 is a table showing actual coordinates and cosine values of coordinate data units.

DETAILED DESCRIPTION OF THE INVENTION

Hereinafter, embodiments of the present invention will be specifically described with reference to the drawings. The present invention is not limited to the following embodiments.

Embodiment 1

FIGS. 1 through 12 illustrate an embodiment of a system and a method for inputting coordinates according to the present invention.

Figure 1:
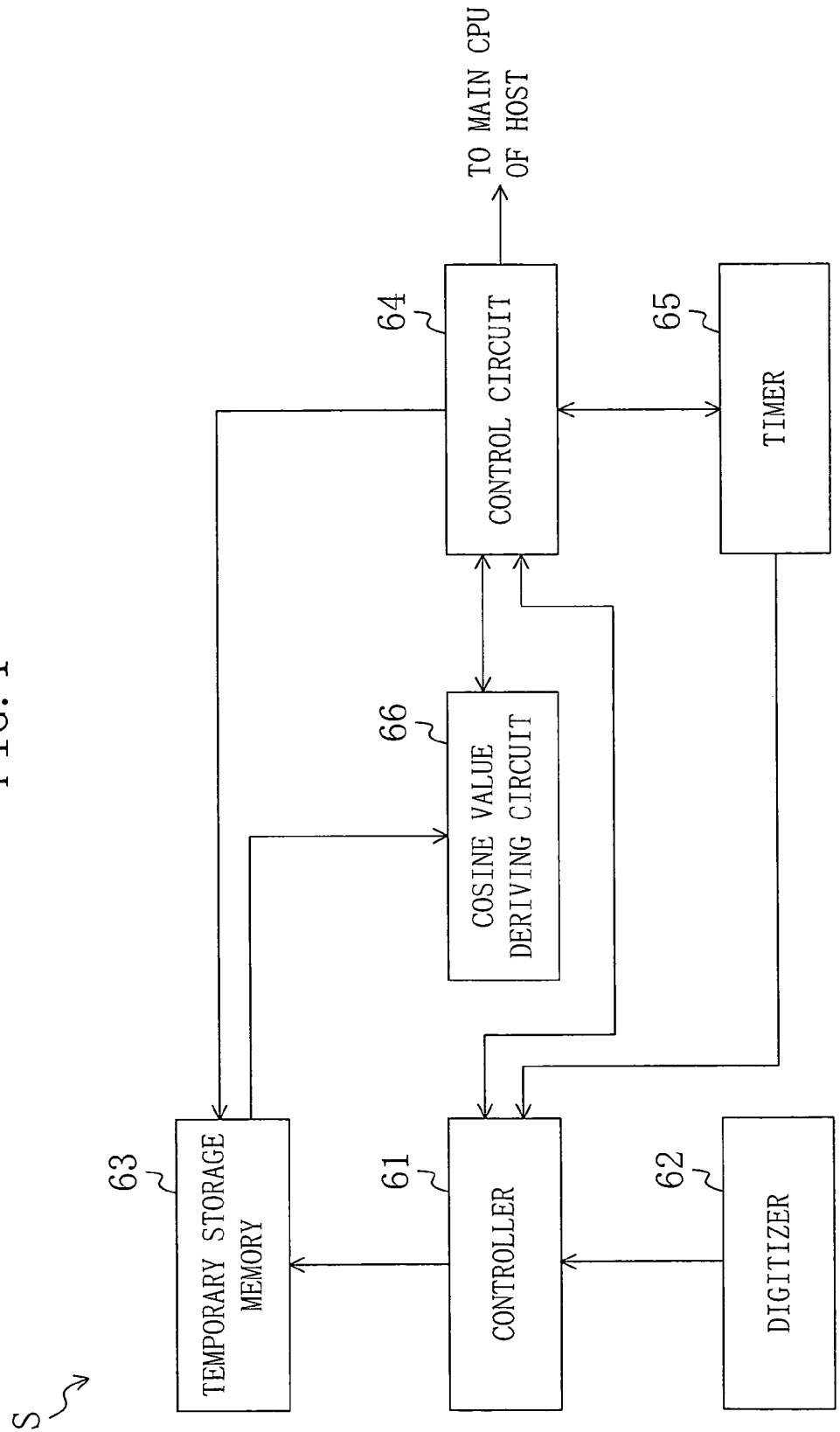
FIG. 1 is a block diagram illustrating a configuration of a coordinate input system.
Figure 2:
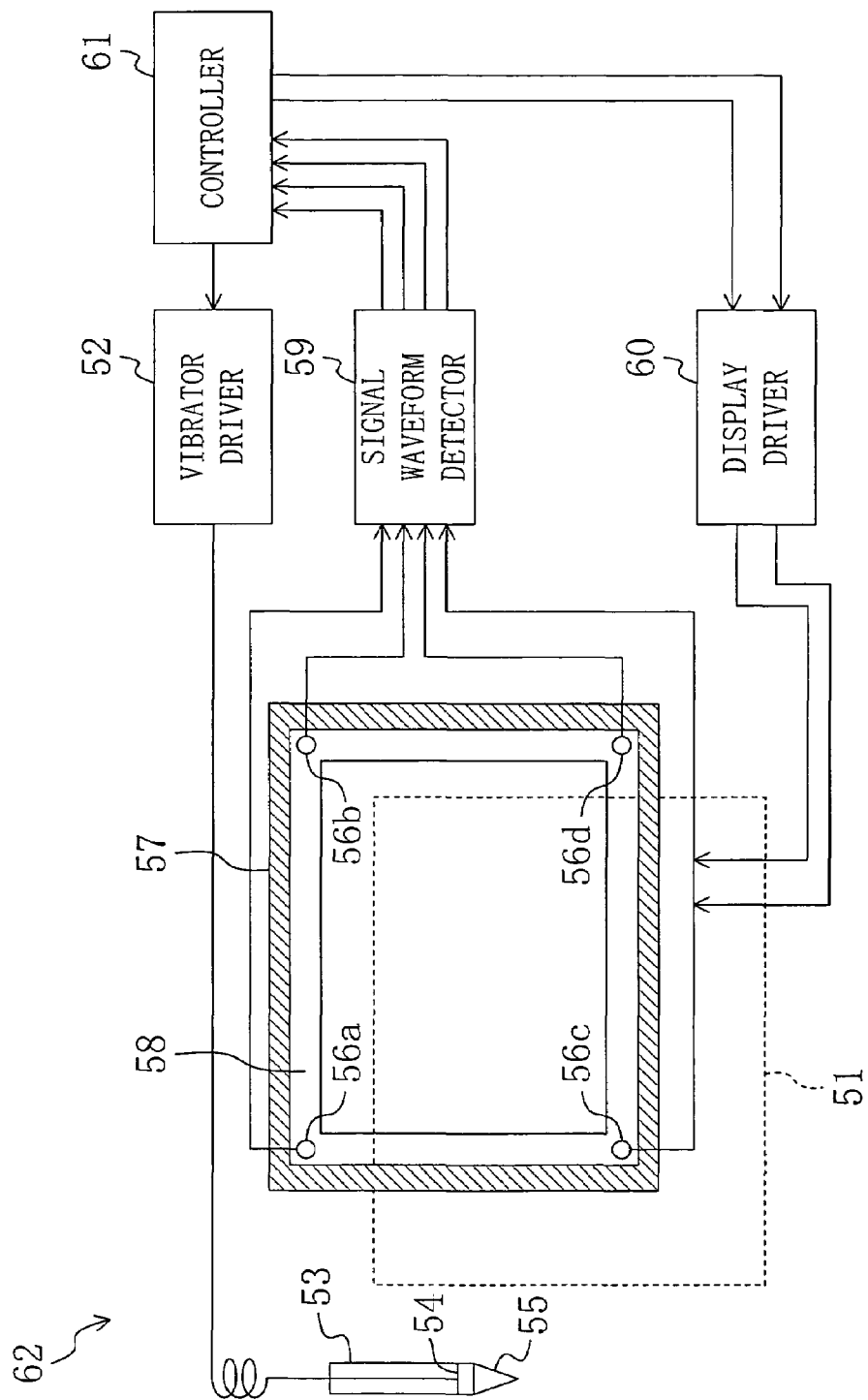
FIG. 2 is a block diagram illustrating a configuration of a digitizer.

FIGS. 1 and 2 are block diagrams illustrating configurations of a coordinate input system S according to this embodiment.

The coordinate input system S includes: a digitizer 62 specifically illustrated in FIG. 2; a controller 61; a timer 65; a temporary storage memory 63 as a storage section; a cosine value deriving circuit 66 as a cosine value deriving section; and a control circuit 64 as a coordinate data selecting section. The controller 61 and the timer 65 serve as a coordinate data extracting section.

Referring now to FIG. 2, the digitizer 62 will be described.

The digitizer 62 is an ultrasonic digitizer and includes: a display 51 as a display section; a vibration transmitting member 58; a vibration input stylus 53; a vibrator driver 52; a signal waveform detector 59; and a display driver 60.

The display 51 is used for allowing the vibration input stylus 53 to indicate coordinate positions. Though not shown specifically, the display 51 includes: a liquid-crystal display panel of, for example, a transparent type; a back-light unit as a light source of the liquid-crystal display panel; and a back-light inverter.

The vibration input stylus 53 is a coordinate input stylus and forms indicating means for indicating coordinate positions on the vibration transmitting member 58. The vibration input stylus 53 includes a vibrator 54 for transmitting coordinate positions as an ultrasonic signal and indicates a given coordinate by bringing a tip 55 of the vibration input stylus 53 into contact with the surface of the vibration transmitting member 58.

The vibrator driver 52 is configured to drive the vibrator 54 of the vibration input stylus 53 when receiving a control signal from the controller 61.

The vibration transmitting member 58 is formed into a screen shape and is opposed to the display 51. The vibration transmitting member 58 includes sensors 56a through 56d as an ultrasonic receiver for receiving an ultrasonic signal from the vibration input stylus 53. Specifically, the sensors 56a through 56d for detecting a vibration occurring on the vibration transmitting member 58 are provided at the respective four corners of the vibration transmitting member 58. The vibration transmitting member 58 is equipped with an antireflection film 57 for preventing reflection of a vibration wave.

The signal waveform detector 59 receives the vibration detected by the sensors 56a through 56d as a signal and detects the waveform of this vibration. The detection result is input to the controller 61.

The display driver 60 is configured to drive the display 51 when receiving a control signal from the controller 61.

When an operator brings the tip 55 of the vibration input stylus 53 into contact with the vibration transmitting member 58 with reference to information displayed on the display 51, a driving signal is supplied from the controller 61 to the vibrator 54 of the vibration input stylus 53 through the vibrator driver 52. Accordingly, the vibrator 54 of the vibration input stylus 53 vibrates and the vibration is transmitted to the vibration transmitting member 58. The vibration transmitted to the vibration transmitting member 58 propagates in the vibration transmitting member 58 at a specific speed and is detected by the sensors 56a through 56d provided in the vibration transmitting member 58.

The signal detected by the sensors 56a through 56d is detected by the signal waveform detector 59 and the detected signal is input to the controller 61.

The controller 61 measures the time necessary for a vibration to reach the sensors 56a through 56d from the output of a driving signal to the vibrator driver 52 and calculates, based on this measured time and a previously-measured propagation speed in the vibration transmitting member 58, the distance between a coordinate position (vibration input position) indicated with the vibration input stylus 53 and each of the sensors 56a through 56d. In this manner, from the distance between the position indicated with the vibration input stylus 53 and each of the sensors 56a through 56d, the coordinate position indicated with the vibration input stylus 53 is obtained based on the Pythagorean theorem.

Now, configurations of the components (i.e., the timer 65, the controller 61, the temporary storage memory 63, the cosine value deriving circuit 66 and the control circuit 64) other than the digitizer 62 will be described with reference to FIG. 1.

The timer 65 measures a given time according to an instruction from the control circuit 64 and outputs signals to the controller 61 and the control circuit 64 for every measurement at the given time. Time data of one type is set in the timer 65 according to, for example, the interval of transmission of coordinate data to the host. This time interval is 10 msec, for example. At intervals of 10 msec, the timer 65 transmits a pulse signal to the controller 61 and an interrupt signal to the control circuit 64.

The controller 61 is configured to extract a plurality of coordinate data units from coordinate positions continuously indicated with the vibration input stylus 53 at every given time measured by the timer 65. For example, in FIG. 3, points 1 through 8 are continuously indicated in the order from the point 1 to the point 8 and are associated with eight coordinate data units extracted by the controller 61.

The temporary storage memory 63 is configured to sequentially store the coordinate data units extracted by the controller 61.

Figure 3:
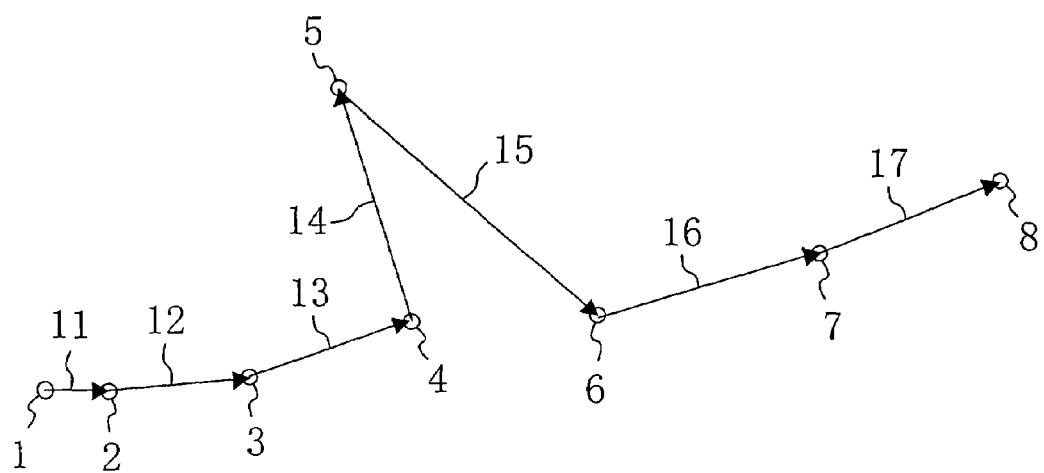
FIG. 3 is a diagram showing points associated with coordinate data units and vectors before interpolation.

As illustrated in FIG. 3, the cosine value deriving circuit 66 defines vectors 11 through 17 connecting the points 1 through 8 associated with the respective coordinate data units stored in the temporary storage memory 63. Specifically, the vector 11 connects the points 1 and 2 together, the vector 12 connects the points 2 and 3 together, the vector 13 connects the points 3 and 4 together, the vector 14 connects the points 4 and 5 together, the vector 15 connects the points 5 and 6 together, the vector 16 connects the points 6 and 7 together, and the vector 17 connects the points 7 and 8 together.

The cosine value deriving circuit 66 derives the cosine value of an angle formed by adjacent two of the vectors (e.g., vectors 12 and 13) sandwiching a point (e.g., the point 3) out of the points 1 through 8.

The control circuit 64 is configured to control operation of the other components (blocks) and select coordinate data to be actually transmitted to a host (a host computer) based on the cosine value derived by the cosine value deriving circuit 66.

That is, the control circuit 64 that has detected an interrupt signal makes the cosine value deriving circuit 66 read coordinate data from the temporary storage memory 63 for cosine value calculation.

When the cosine value derived by the cosine value deriving circuit 66 is smaller than a given value (e.g., 0.8), coordinate data associated with the given point (e.g., the point 5) is discarded. On the other hand, when the cosine value is equal to or larger than the given value (e.g., 0.8), coordinate data associated with the given point (e.g., the point 3) is transmitted and input to the host.

In this manner, coordinate data is actually transmitted to the host only when the cosine value is equal to or larger than a given value and is considered normal. In addition, the control circuit 64 also transmits and inputs, to the host, coordinate data at a pen-up event of the vibration input stylus (i.e., when the stylus is lifted).

Figure 4:
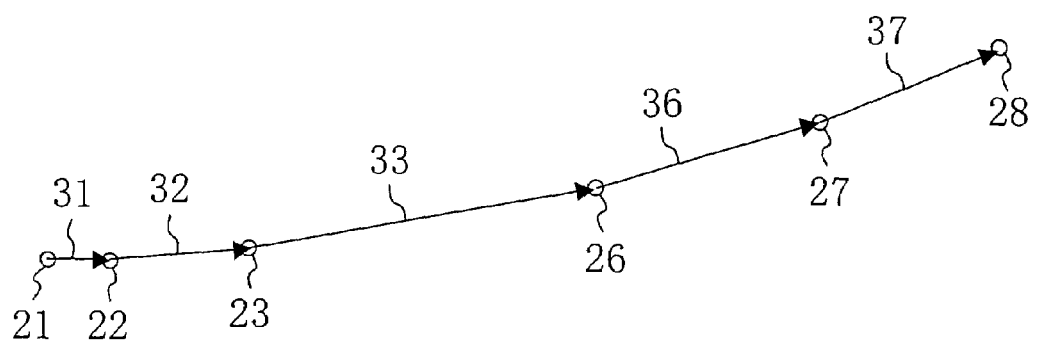
FIG. 4 is a diagram showing points associated with coordinate data units and vectors after interpolation.

This series of operation is performed on a plurality coordinate data units. For example, as illustrated in FIG. 4, coordinate data units from which a sharp projection of vectors has been removed are selected from coordinate data units sampled as illustrated in FIG. 3. This enables expression (linear interpolation) closer to coordinate positions (handwriting) indicated by an operator.

The points 1 through 3 and 6 through 8 in FIG. 3 correspond to the points 21 through 23 and 26 through 28 in FIG. 4, respectively. The vectors 11, 12, 16 and 17 in FIG. 3 correspond to the vectors 31, 32, 36 and 37 in FIG. 4, respectively.

Referring now to FIGS. 5 through 9, a method for deriving the cosine value described above will be described.

Figure 5:
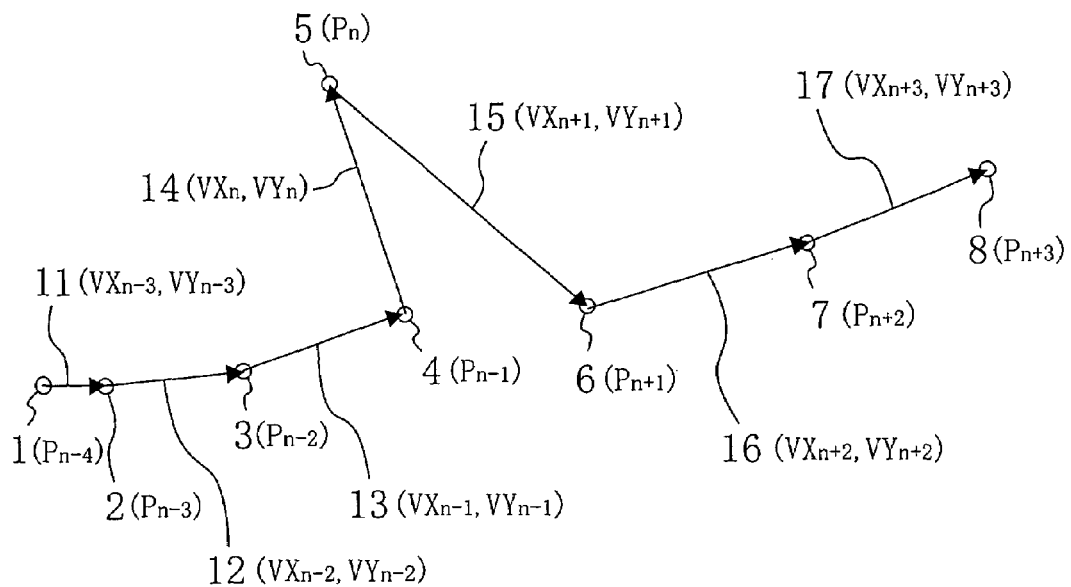
FIG. 5 is a diagram showing points associated with coordinate data units and vectors before interpolation.

In FIG. 5, the points 1 through 8 are associated with respective coordinate data units $P_{n-4}$ through $P_{n+3}$ extracted by the controller 61 from coordinate positions detected by the digitizer 62. Vectors 11 through 17 connect the points 1 through 8.

Signal lines connecting the sensors 56a through 56d to the signal waveform detector 59 are contaminated by a noise generated in, for example, the back-light inverter, so that abnormal coordinate data is included in the coordinate data units $P_{n-4}$ through $P_{n+3}$ extracted by the controller 61. As a result, as illustrated in FIG. 5, the vectors 11 through 17 include vectors whose directions greatly change. In this embodiment, such abnormal coordinate data is removed.

Figure 6:
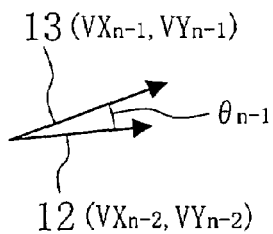
FIG. 6 is a diagram showing an angle $\theta_{n-1}$ formed by two vectors.
Figure 7:
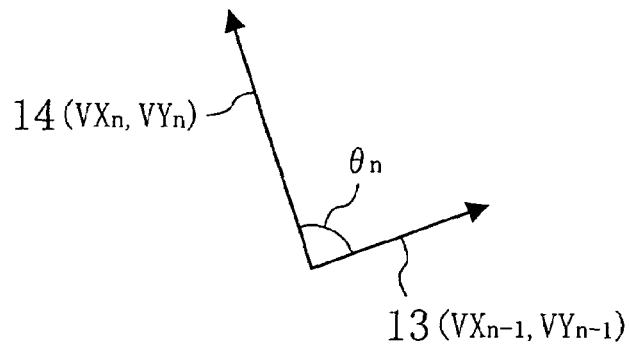
FIG. 7 is a diagram showing an angle $\theta_n$ formed by two vectors.
Figure 8:
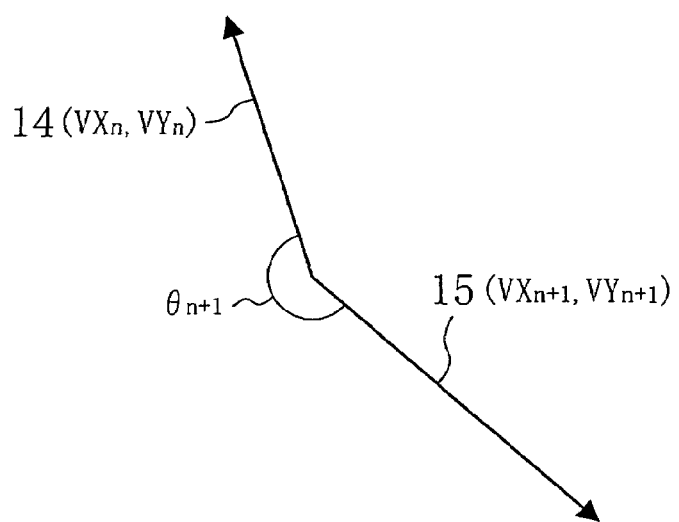
FIG. 8 is a diagram showing an angle $\theta_{n+1}$ formed by two vectors.
Figure 9:
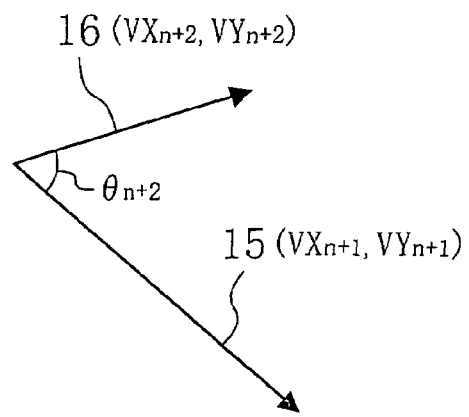
FIG. 9 is a diagram showing an angle $\theta_{n+2}$ formed by two vectors.

As shown in FIG. 6, an angle $\theta_{n-1}$ is formed by the vector 12 connecting the points 2 and 3 and the vector 13 connecting the points 3 and 4. As shown in FIG. 7, an angle $\theta_n$ is formed by the vector 13 and the vector 14 connecting the points 4 and 5. As shown in FIG. 8, an angle $\theta_{n+1}$ is formed by the vector 14 and the vector 15 connecting the points 5 and 6. As shown in FIG. 9, an angle $\theta_{n+2}$ is formed by the vector 15 and the vector 16 connecting the points 6 and 7.

It is defined that the vector 11 connecting the points 1 and 2 is $(VX_{n-3}, VY_{n-3})$, the vector 12 is $(VX_{n-2}, VY_{n-2})$, the vector 13 is $(VX_{n-1}, VY_{n-1})$, the vector 14 is $(VX_n, VY_n)$, the vector 15 is $(VX_{n+1}, VY_{n+1})$, the vector 16 is $(VX_{n+2}, VY_{n+2})$, and the vector 17 connecting the points 7 and 8 is $(VX_{n+3}, VY_{n+3})$.

Suppose $\theta_n = \alpha_n - \alpha_{n-1}$, according to the addition theorem, $\cos \theta_n$ is expressed by Equation 1:

$$\cos \theta_n = \cos \alpha_n \cos \alpha_{n-1} + \sin \alpha_n \sin \alpha_{n-1} \quad [1]$$

In addition, $\sin \alpha_n$, $\sin \alpha_{n-1}$, $\cos \alpha_n$ and $\cos \alpha_{n-1}$ are respectively expressed by Equations 2 through 5:

$$\sin \alpha_n = \frac{VX_n}{\sqrt{VX_n^2 + VY_n^2}} \quad [2]$$

$$\sin \alpha_{n-1} = \frac{VX_{n-1}}{\sqrt{VX_{n-1}^2 + VY_{n-1}^2}} \quad [3]$$

$$\cos \alpha_n = \frac{VY_n}{\sqrt{VX_n^2 + VY_n^2}} \quad [4]$$

$$\cos \alpha_{n-1} = \frac{VY_{n-1}}{\sqrt{VX_{n-1}^2 + VY_{n-1}^2}} \quad [5]$$

Accordingly, if Equations 2 through 5 substitute for Equation 1, $\cos \theta_n$ is expressed by Equation 6:

$$\cos \theta_n = \frac{VX_n VX_{n-1} + VY_n VY_{n-1}}{\sqrt{VX_n^2 + VY_n^2}\sqrt{VX_{n-1}^2 + VY_{n-1}^2}} \quad [6]$$

In the same manner, for example, $\cos \theta_{n+1}$ and $\cos \theta_{n-1}$ are respectively expressed by Equations 7 and 8:

$$\cos \theta_{n+1} = \frac{VX_{n+1} VX_n + VY_{n+1} VY_n}{\sqrt{VX_{n+1}^2 + VY_{n+1}^2}\sqrt{VX_n^2 + VY_n^2}} \quad [7]$$

$$\cos \theta_{n-1} = \frac{VX_{n-1} VX_{n-2} + VY_{n-1} VY_{n-2}}{\sqrt{VX_{n-1}^2 + VY_{n-1}^2}\sqrt{VX_{n-2}^2 + VY_{n-2}^2}} \quad [8]$$

The control circuit 64 compares the derived cosine value with a given threshold value and selects coordinate data only when this cosine value is equal to or larger than the threshold value.

Figure 10:
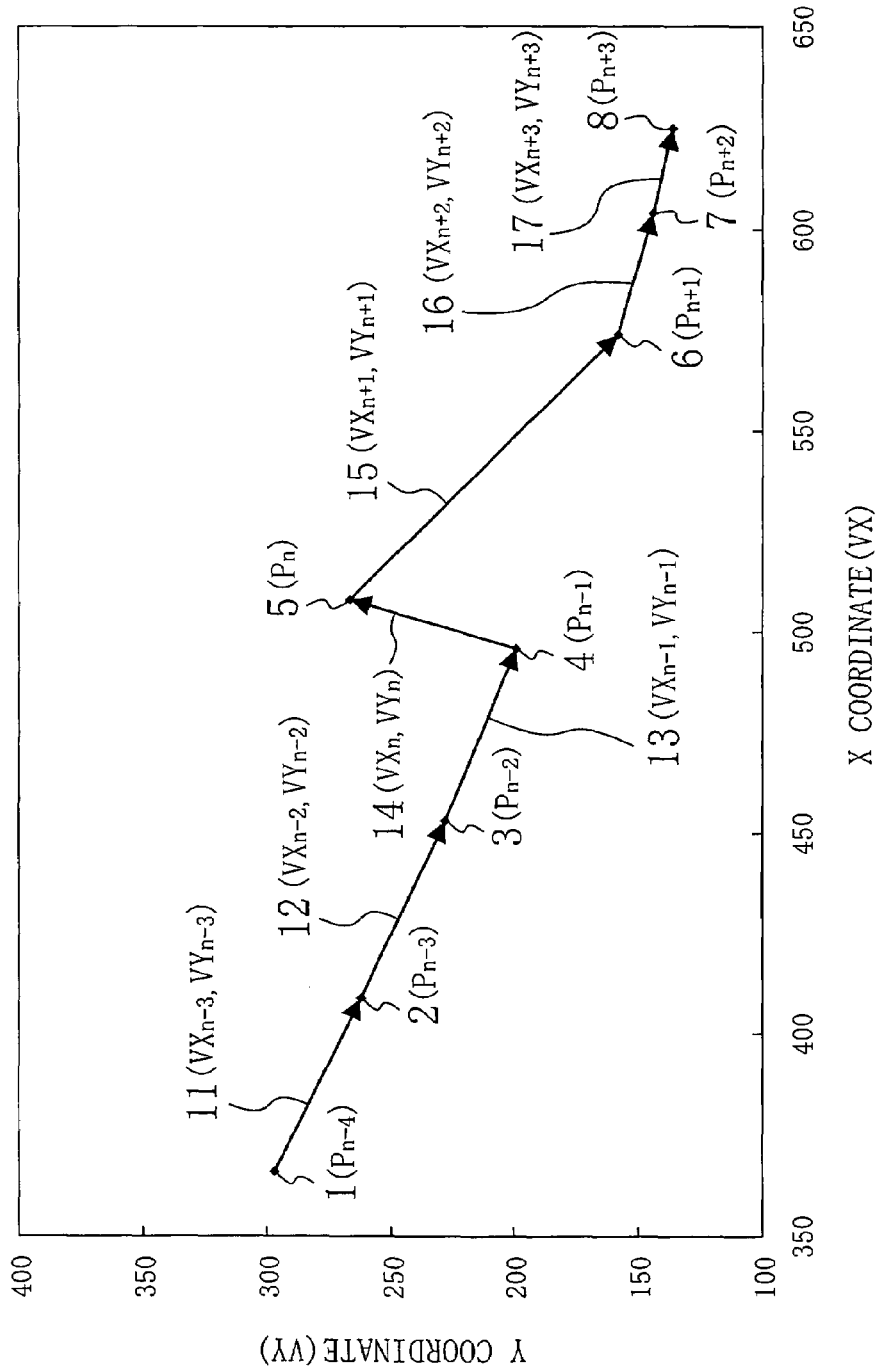
FIG. 10 is a graph showing points associated with actual coordinate data units and vectors.

FIG. 10 shows the points 1 through 8 associated with the coordinate data units $P_{n-4}$ through $P_{n+3}$ actually extracted by the controller 61 and the vectors 11 $(VX_{n-3}, VY_{n-3})$ through 17 $(VX_{n+3}, VY_{n+3})$. FIG. 13 shows a table showing actual coordinates and cosine values $\cos \theta$ of the coordinate data units $P_{n-4}$ through $P_{n+3}$.

First, the cosine value $\cos \theta_{n-1}$ of the angle $\theta_{n-1}$ formed by the vector 12 $(VX_{n-2}, VY_{n-2})$ connecting the points 2 and 3 and the vector 13 $(VX_{n-1}, VY_{n-1})$ connecting the points 3 and 4 is compared with a given threshold value (e.g., 0.8). In this case, the cosine value $\cos \theta_{n-1}$ is 0.998 and is larger than the threshold value of 0.8. Accordingly, the coordinate data $P_{n-2}$ associated with the point 3 as a junction point of the two vectors 12 and 13 is transmitted to the host computer.

Next, the cosine value $\cos \theta_n$ of the angle $\theta_n$ formed by the vector 13 $(VX_{n-1}, VY_{n-1})$ and the vector 14 $(VX_n, VY_n)$ is compared with the threshold value. In this case, the cosine value $\cos \theta_n$ is −0.407 and is smaller than the threshold value of 0.8. Accordingly, the coordinate data $P_{n-1}$ associated with the point 4 as a junction point of the two vectors 13 and 14 is not transmitted to the host computer.

Then, the cosine value $\cos \theta_{n+1}$ of the angle $\theta_{n+1}$ formed by the vector 14 $(VX_n, VY_n)$ and the vector 15 $(VX_{n+1}, VY_{n+1})$ is compared with the threshold value. In this case, the cosine value $\cos \theta_{n+1}$ is −0.752 and is smaller than the threshold value of 0.8. Accordingly, the coordinate data $P_n$ associated with the point 5 as a junction point of the two vectors 14 and 15 is not transmitted to the host computer.

Thereafter, the cosine value $\cos \theta_{n+2}$ of the angle $\theta_{n+2}$ formed by the vector 15 $(VX_{n+1}, VY_{n+1})$ and the vector 16 $(VX_{n+2}, VY_{n+2})$ is compared with the threshold value. In this case, the cosine value $\cos \theta_{n+2}$ is 0.831 and is larger than the threshold value of 0.8. Accordingly, the coordinate data $P_{n+1}$ associated with the point 6 as a junction point of the two vectors 15 and 16 is transmitted to the host computer.

Subsequently, the cosine value $\cos \theta_{n+3}$ of the angle $\theta_{n+3}$ formed by the vector 16 $(VX_{n+2}, VY_{n+2})$ and the vector 17 $(VX_{n+3}, VY_{n+3})$ is compared with the threshold value. In this case, the cosine value $\cos \theta_{n+3}$ is 0.997 and is larger than the threshold value of 0.8. Accordingly, the coordinate data $P_{n+2}$ associated with the point 7 as a junction point of the two vectors 16 and 17 is transmitted to the host computer.

A pen-up event of the vibration input stylus 53 for indicating coordinate positions occurs after extraction of the coordinate data $P_{n+3}$ associated with the point 8, so that the coordinate data $P_{n+3}$ associated with the point 8 is transmitted to the host computer as a pen-up coordinate.

Figure 11:
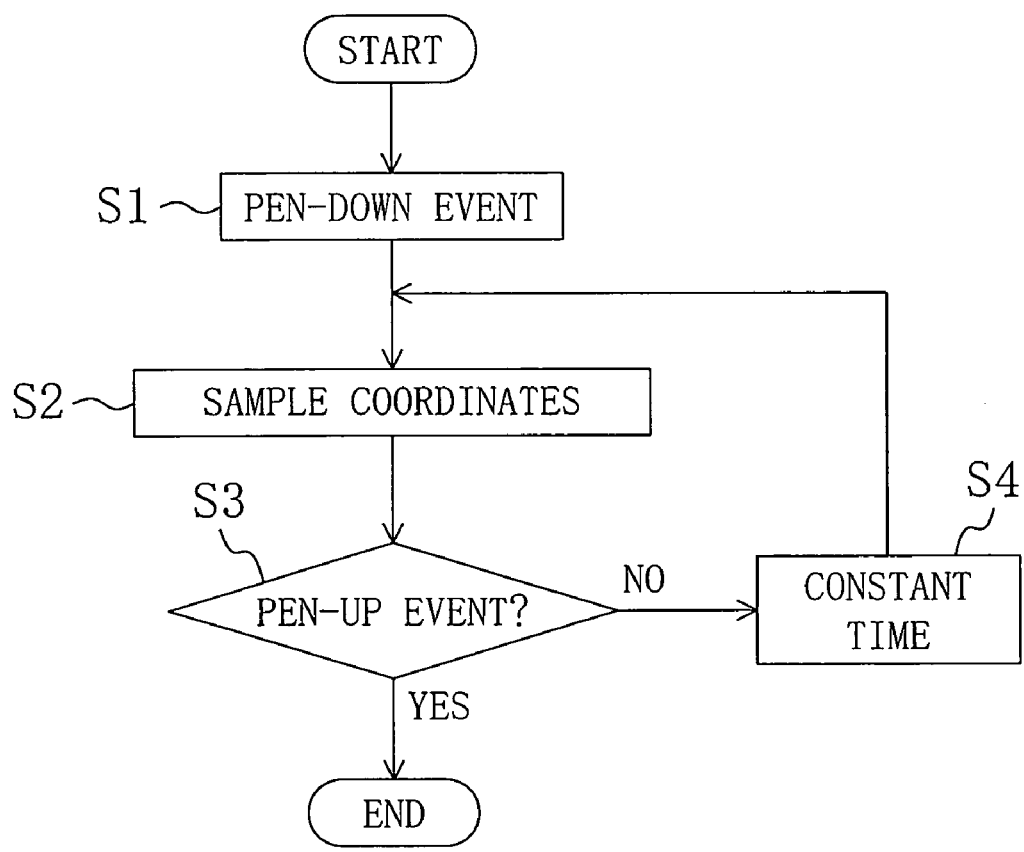
FIG. 11 is a flowchart showing extraction of coordinate data.

Referring now to flowcharts shown in FIGS. 11 and 12, operation of the coordinate input system S (coordinate input method) will be described. First, it will be described how coordinate data is extracted by the controller 61 with reference to FIG. 11.

First, at step S1, a pen-down event in which the vibration input stylus 53 is brought into contact with the vibration transmitting member 58 occurs, and then the process proceeds to step S2. At step S2, the sensors, 56*a* through 56*d* detect coordinate positions on the vibration transmitting member 58 indicated by the contact with the vibration input stylus 53, and coordinate values are sampled (extracted) as coordinate data units at every given time (a first step). Thereafter, the extracted coordinate data units are sequentially stored in the temporary storage memory 63 (a second step). Then, the process proceeds to step S3.

At step S3, it is determined whether or not a pen-up event of the vibration input stylus 53 occurs (i.e., whether or not the vibration input stylus 53 is moved from the vibration transmitting member 58). If the pen-up event occurs, the process is terminated. On the other hand, the pen-up event has not occurred yet, the process proceeds to step S4.

At step S4, the process is suspended until a pulse signal is input from the timer 65 (e.g., for 10 msec.). If the pulse signal is input from the timer 65, the process returns to step S2. That is, during the pen-down event, step S2 is repeated.

Figure 12:
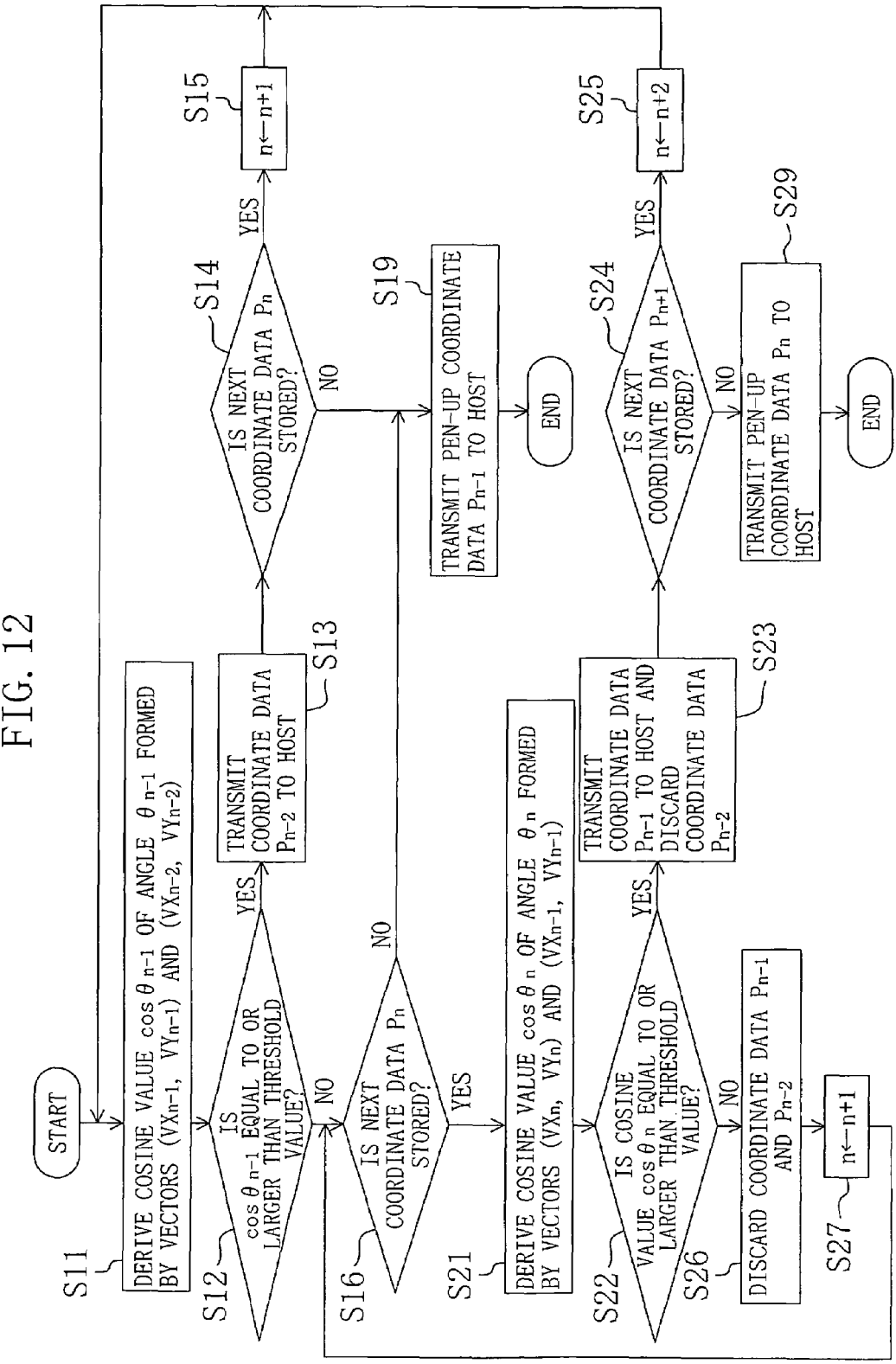
FIG. 12 is a flowchart showing selection of coordinate data.

Referring now to FIG. 12, it will be described how appropriate coordinate data is selected.

This selection is performed by cooperation of the control circuit 64 and the cosine value deriving circuit 66. The process shown in the flowchart in FIG. 12 may be performed with another control program for the coordinate input system of this embodiment.

First, at step S11, the cosine value deriving circuit 66 reads the coordinate data units $P_{n-4}$ through $P_{n-1}$ from the temporary storage memory 63 and defines two vectors 12 $(VX_{n-2}, VY_{n-2})$ and 13 $(VX_{n-1}, VY_{n-1})$ from the points 1 through 4 associated with these coordinate data units $P_{n-4}$ through $P_{n-1}$.

Then, the cosine value $\cos\theta_{n-1}$ of the angle $\theta_{n-1}$ formed by the vectors 12 and 13 is derived (a third step).

Next, at step S12, it is determined whether or not the cosine value $\cos\theta_{n-1}$ derived at step S11 is equal to or larger than a threshold value (0.8). If the cosine value $\cos\theta_{n-1}$ is equal to or larger than the threshold value, the process proceeds to step S13.

At step S13, the coordinate data $P_{n-2}$ is transmitted to the host computer (a fourth step), and the process proceeds to step S14.

At step S14, it is determined whether or not the next coordinate data $P_n$ is stored in the temporary storage memory 63. If the coordinate data $P_n$ is stored, the process proceeds to step S15 and n is incremented by one, and then the process returns to step S11.

If it is determined that the coordinate data $P_n$ is not stored at step S14 (i.e., a pen-up event occurs), the process proceeds to step S19. At step S19, the coordinate data $P_{n-1}$ is transmitted to the host computer as the last coordinate data (i.e., coordinate data at a pen-up event), and then the process is terminated.

On the other hand, if the cosine value $\cos\theta_{n-1}$ is neither equal to nor larger than the threshold value at step S12, the process proceeds to step S16, and it is determined whether or not the next coordinate data $P_n$ is stored in the temporary storage memory 63. If the coordinate data $P_n$ is not stored, the process proceeds to step S19, and the last coordinate data $P_{n-1}$ is transmitted to the host computer as coordinate data at a pen-up event. Thereafter, the process is terminated.

If it is determined that the coordinate data $P_n$ is stored at step S16, the process proceeds to step S21, and the coordinate data units $P_{n-3}$ through $P_n$ are read out from the temporary storage memory 63 and the two vectors 13 ($VX_{n-1}, VY_{n-1}$) and 14 ($VX_n, VY_n$) are defined from the points 2 through 5 associated with these coordinate data units $P_{n-3}$ through $P_n$. Then, the cosine value $\cos\theta_n$ of the angle $\theta_n$ formed by the vectors 13 and 14 is derived (the third step).

Thereafter, at step S22, it is determined whether or not the cosine value $\cos\theta_n$ derived at step S21 is equal to or larger than the threshold value. If the cosine value $\cos\theta_n$ is equal to or larger than the threshold value, the process proceeds to step S23.

At step S23, the coordinate data $P_{n-1}$ is transmitted to the host computer whereas the coordinate data $P_{n-2}$ is discarded (the fourth step). That is, the coordinate data $P_{n-2}$ is not transmitted to the host computer. Thereafter, the process proceeds to step S24.

At step S24, it is determined whether or not the next coordinate data $P_{n+1}$ is stored in the temporary storage memory 63. If the coordinate data $P_{n+1}$ is stored, the process proceeds to step S25 and n is incremented by two, and the process returns to step S11.

If it is determined that the coordinate data $P_{n+1}$ is not stored (i.e., a pen-up event occurs) at step S24, the process proceeds to step S29. At step S29, the coordinate data $P_n$ is transmitted to the host computer as the last coordinate data (i.e., coordinate data at a pen-up event), and then the process is terminated.

On the other hand, if it is determined that the cosine value $\cos\theta_n$ is neither equal to nor larger than the threshold value at step S22, the process proceeds to step S26, and the coordinate data units $P_{n-1}$ and $P_{n-2}$ are discarded (the fourth step). That is, the coordinate data units $P_{n-1}$ and $P_{n-2}$ are not transmitted to the host computer. Thereafter, the process proceeds to step S27 and n is incremented by one, and then the process returns to step S16.

In the foregoing manner, abnormal coordinate data is removed from the coordinate data units $P_{n-4}$ and $P_{n+3}$ extracted by the controller 61, and only normal coordinate data is transmitted and input to the host computer.

Advantages of Embodiment 1

Accordingly, in the first embodiment, the vectors 11 through 17 connecting the points 1 through 8 associated with respective coordinate data units are defined, the cosine value of an angle formed by two adjacent vectors sandwiching one of the points 1 through 8 is derived, and it is determined whether or not this cosine value is equal to or larger than a given threshold value, thereby detecting abnormal coordinate data.

Specifically, even if the controller 61 extracts abnormal coordinate data from indicated coordinate positions because of a noise generated from, for example, the back-light inverter, this abnormal coordinate data is discarded by the control circuit 64 and only normal coordinate data is transmitted and input to the host. As a result, the path formed by coordinate positions including abnormal coordinate data is interpolated in a preferred manner, so that the host is allowed to identify a path closely matching actually-indicated coordinate positions.

Other Embodiments

In the first embodiment, the digitizer 62 is an ultrasonic digitizer. However, the present invention is not limited to this, and is applicable to other types of digitizer such as a digitizer of a resistive-film type or a digitizer of an electromagnetic-induction type and also to pointing devices such as a mouse in the same manner.

The present invention is applicable to systems including a plurality of components such as host computers, interfaces and printers and is also applicable to systems each formed by a single component.

The present invention is, of course, applicable to cases implemented by supplying a program to a coordinate input system or a coordinate input apparatus. In these cases, a storage medium that stores a program for a coordinate input method according to the present invention forms the present invention. If the program is read out from the storage medium, the coordinate input system or coordinate input apparatus operates according to a method defined by the program.

As described above, the present invention is useful for coordinate input systems and methods for inputting coordinate data to a host based on indicated coordinate positions, and suitable especially for a case where the host is to identify a path closely matching actually-indicated coordinate positions.

What is claimed is:

1. A coordinate input system, comprising:
   indicating means for indicating coordinate positions;
   a coordinate data extracting section for sequentially extracting a plurality of coordinate data units from the coordinate positions indicated with the indicating means;
   a storage section for storing the coordinate data units in the order of the extraction;
   a cosine value deriving section for defining vectors connecting a plurality of points associated with the respective coordinate data units in the order of the storage, and for deriving a cosine value of an angle formed by two adjacent vectors of a point selected from the plurality of points; and a coordinate data selecting section for discarding one of the coordinate data units associated with the selected point when the cosine value derived by the cosine value deriving section is smaller than a given value and for transmitting and inputting one of the coordinate data units associated with the selected point to a host when the cosine value is equal to or larger than the given value.

2. The coordinate input system of claim 1, wherein the coordinate data extracting section extracts coordinate data units from the indicated coordinate positions at every given time.

3. The coordinate input system of claim 1, wherein the indicating means is a coordinate input stylus.

4. The coordinate input system of claim 3, wherein the coordinate data selecting section transmits and inputs, to the host, a coordinate data unit obtained when the coordinate input stylus is lifted.

5. The coordinate input system of claim 1, wherein the indicating means is configured to transmit the coordinate positions as an ultrasonic signal, and
the coordinate input system further comprises an ultrasonic receiver for receiving the ultrasonic signal.

6. The coordinate input system of claim 1, further comprising a display section for allowing the indicating means to indicate coordinate positions, the display section including a back-light inverter.

7. A method for inputting coordinates, the method comprising the steps of:
(a) extracting a plurality of coordinate data units from indicated coordinate positions;
(b) sequentially storing the coordinate data units extracted in the step (a);
(c) defining vectors connecting a plurality of points associated with the respective coordinate data units stored in the step (b), and deriving a cosine value of an angle formed by two adjacent vectors of a point selected from the plurality of points; and
(d) discarding one of the coordinate data units associated with the selected point when the cosine value derived in the step (c) is smaller than a given value, and transmitting and inputting one of the coordinate data units associated with the selected point to a host when the cosine value is equal to or larger than the given value.

8. The method of claim 7, wherein in the step (a), coordinate data units are extracted from the indicated coordinate positions at every given time.

9. The method of claim 7, wherein in the step (a), the coordinate positions are indicated with a coordinate input stylus.

10. The method of claim 9, wherein in the step (d), a coordinate data unit obtained when the coordinate input stylus is lifted is transmitted and input to the host.

11. The method of claim 7, wherein in the step (a), the coordinate positions are transmitted as an ultrasonic signal and are received by an ultrasonic receiver.

12. The method of claim 7, wherein in the step (a), the coordinate positions are indicated in a display section including a back-light inverter.

* * * * *